US011216954B2

(12) United States Patent
Peled et al.

(10) Patent No.: US 11,216,954 B2
(45) Date of Patent: Jan. 4, 2022

(54) SYSTEMS AND METHODS FOR REAL-TIME ADJUSTMENT OF NEURAL NETWORKS FOR AUTONOMOUS TRACKING AND LOCALIZATION OF MOVING SUBJECT

(71) Applicant: TG-17, LLC, Boston, MA (US)

(72) Inventors: Olga Peled, Petah Tikva (IL); Yaacob Aizer, Ganei Tikva (IL); Zcharia Baratz, Tel-Aviv (IL); Ran Banker, Kfar Saba (IL); Joseph Keshet, Tel-Aviv (IL); Ron Asher, Tel-Aviv (IL)

(73) Assignee: TG-17, Inc., Boston, MA (US)

( * ) Notice: Subject to any disclaimer, the term of this patent is extended or adjusted under 35 U.S.C. 154(b) by 190 days.

(21) Appl. No.: 16/416,887

(22) Filed: May 20, 2019

(65) Prior Publication Data
US 2019/0325584 A1   Oct. 24, 2019

Related U.S. Application Data

(63) Continuation-in-part of application No. 15/956,456, filed on Apr. 18, 2018, now Pat. No. 10,600,295.

(51) Int. Cl.
*G08B 13/196* (2006.01)
*G08B 25/01* (2006.01)
(Continued)

(52) U.S. Cl.
CPC .............. *G06T 7/20* (2013.01); *B64C 39/024* (2013.01); *G05D 1/0094* (2013.01); *G05D 1/101* (2013.01);
(Continued)

(58) Field of Classification Search
CPC ...... G08B 13/196; G08B 25/00; G08B 25/10; G08B 19/00; G08B 25/01; B63G 8/38;
(Continued)

(56) References Cited

U.S. PATENT DOCUMENTS 9,522,732 B1 * 12/2016 Froloff ................. B64C 39/024
9,589,448 B1 *  3/2017 Schneider .......... G08B 13/1965
(Continued)

OTHER PUBLICATIONS

International Search Report and Written Opinion in corresponding international application No. PCT/US2020/033554 dated Aug. 27, 2020.

*Primary Examiner* — P. E. Yuri Kan
(74) *Attorney, Agent, or Firm* — Polsinelli, P.C.

(57) ABSTRACT

A goal of the disclosure is to provide real-time adjustment of a deep learning-based tracking system to track a moving individual without using a labeled set of training data. Disclosed are systems and methods for tracking a moving individual with an autonomous drone. Initialization video data of the specific individual is obtained. Based on the initialization video data, real-time training of an input neural network is performed to generate a detection neural network that uniquely corresponds to the specific individual. Real-time video monitoring data of the specific individual and the surrounding environment is captured. Using the detection neural network, target detection is performed on the real-time video monitoring data and a detection output corresponding to a location of the specific individual within a given frame of the real-time video monitoring data is generated. Based on the detection output, first tracking commands are generated to maneuver and center the camera on the location of the specific individual.

13 Claims, 3 Drawing Sheets

(51) Int. Cl.
*G06T 7/20* (2017.01)
*H04N 13/296* (2018.01)
*G08B 19/00* (2006.01)
*G06N 3/08* (2006.01)
*G05D 1/00* (2006.01)
*G05D 1/10* (2006.01)
*B64C 39/02* (2006.01)
*G06K 9/62* (2006.01)
*G06K 9/00* (2006.01)
*G05D 1/12* (2006.01)

(52) U.S. Cl.
CPC ........... *G05D 1/12* (2013.01); *G06K 9/00369* (2013.01); *G06K 9/6259* (2013.01); *G06N 3/08* (2013.01); *B64C 2201/127* (2013.01); *G06T 2207/20084* (2013.01)

(58) Field of Classification Search
CPC ........... B64F 1/04; B64C 39/02; B64C 25/32; H04N 1/00; H04N 13/296; G06T 7/20; G06T 7/292; G06T 13/20
See application file for complete search history.

(56) References Cited

U.S. PATENT DOCUMENTS

| | | | |
|---|---|---|---|
| 9,888,133 B2* | 2/2018 | Kida | H04N 1/00129 |
| 10,600,295 B2* | 3/2020 | Kempel | G05D 1/0027 |
| 2006/0176169 A1* | 8/2006 | Doolin | G08B 17/00 340/521 |
| 2013/0135315 A1* | 5/2013 | Bares | G11B 27/031 345/473 |
| 2013/0266181 A1 | 10/2013 | Brewer | |
| 2015/0183498 A1* | 7/2015 | Wardle | B63G 8/38 114/337 |
| 2015/0339912 A1* | 11/2015 | Farrand | G08B 25/001 340/501 |
| 2016/0042637 A1* | 2/2016 | Cahill | G08B 25/10 701/3 |
| 2017/0092109 A1* | 3/2017 | Trundle | G08B 25/006 |
| 2017/0161591 A1 | 6/2017 | English | |
| 2018/0029706 A1* | 2/2018 | Baruch | H04W 76/14 |
| 2018/0158197 A1* | 6/2018 | Dasgupta | G06K 9/726 |
| 2018/0244402 A1* | 8/2018 | Kahlon | B64F 1/04 |
| 2018/0278919 A1* | 9/2018 | Lee | G06T 7/285 |
| 2018/0293429 A1 | 10/2018 | Wechsler | |

* cited by examiner

SYSTEMS AND METHODS FOR REAL-TIME ADJUSTMENT OF NEURAL NETWORKS FOR AUTONOMOUS TRACKING AND LOCALIZATION OF MOVING SUBJECT

CROSS-REFERENCE TO RELATED APPLICATIONS

This application is a continuation in part of U.S. patent application Ser. No. 15/956,456 filed Apr. 18, 2018 and entitled "SYSTEM AND METHOD FOR THREAT MONITORING, DETECTION, AND RESPONSE," the disclosure of which is herein incorporated by reference in its entirety.

TECHNICAL FIELD

The present disclosure pertains to monitoring systems and devices, and more specifically to real-time adjustment of neural networks for autonomous tracking and localization of a moving subject.

BACKGROUND

While the problem of object tracking can appear deceptively simple on its surface, it in reality poses a complex challenge involving a plethora of different variables and environmental factors that must be accounted for. Conventional tracking systems are almost always limited to tracking only certain types of targets or targets with suitable characteristics, e.g. targets of a certain size, targets of a certain material composition, or targets having some other property to which the tracking system is attuned. Many recent efforts have focused on implementing computer or machine learning systems to computationally locate and track objects, with a goal of achieving a more robust range of targets and environments for which tracking can be performed.

However, while machine learning may be suitable to begin solving this problem, machine learning approaches are fundamentally limited by the extreme difficulty in obtaining a large volume of accurate and training data that is evenly distributed over all classes or types of objects that the system needs to be able to identify. Moreover, substantial amounts of time and computational power are required to train a machine learning system over these large training data sets, making it impractical or impossible for the machine learning system to be adjusted or further trained after it has been deployed into the field.

SUMMARY OF THE INVENTION

Accordingly, it is a goal of the present invention to provide a deep learning-based tracking system that can be adjusted, in substantially real-time and without a labeled set of training data, to track a specific individual or moving subject.

According to an aspect of the invention, an autonomous tracking method comprises obtaining Subject initialization video data, the Subject initialization video data comprising a plurality of video frames of a desired Subject for tracking; based on the Subject initialization video data, performing real-time training or real-time re-training of an input neural network to generate a Subject detection neural network, wherein the Subject detection neural network is specific to the desired Subject; capturing, using a camera, real-time video monitoring data comprising a plurality of video frames of the desired Subject and a surrounding environment of the Subject; using the Subject detection neural network, performing Subject detection on the real-time video monitoring data to generate a detection output corresponding to a location of the desired Subject within a given frame of the real-time video monitoring data; and generating, based on the detection output, one or more first tracking commands maneuvering the camera such that the camera is centered on the location of the desired Subject.

In an aspect of the invention, the method further comprises using a Subject tracking neural network, performing Subject tracking based on at least the detection output of the Subject detection neural network; and generating, using the Subject tracking neural network, a tracking output corresponding to a predicted location of the desired Subject within the given frame of the real-time video monitoring data.

In an aspect of the invention, the method further comprises generating, based on the tracking output, one or more second tracking commands maneuvering the camera such that the camera is centered on the predicted location of the desired Subject.

In an aspect of the invention, Subject tracking is further performed based on one or more previously captured frames of the real-time video monitoring data.

In an aspect of the invention, the detection output of the Subject detection neural network comprises bounding box coordinates corresponding to a pixel area of the given frame of real-time video monitoring data in which the desired Subject is located.

In an aspect of the invention, the tracking output of the Subject tracking neural network comprises one or more predicted bounding box coordinates, wherein the predicted bounding box coordinates correspond to a predicted pixel area of the given frame of real-time video monitoring data that contains the Subject's predicted location.

In an aspect of the invention, the input neural network is pre-trained on one or more object detection training datasets or object classification training datasets.

In an aspect of the invention, the input neural network is pre-trained on supplemental training data, wherein the supplemental training data comprises labeled video or image data of a plurality of humans in low-light conditions.

In an aspect of the invention, the Subject initialization video data is collected in response to a tracking session being triggered for the desired Subject.

In an aspect of the invention, the Subject initialization video consists of 5-10 seconds of video data.

In an aspect of the invention, the camera is coupled to a drone; and the one or more first tracking commands are generated to maneuver the drone to a spatial coordinate calculated to center the camera on the location of the desired Subject.

In an aspect of the invention, real-time training of the input neural network is performed by a Graphics Processing Unit (GPU) onboard the drone.

In an aspect of the invention, the one or more first tracking commands are generated by a PID (proportional-integral-derivative) controller.

In an aspect of the invention, one or more of the input neural network and the Subject detection neural network comprise a deep learning-based tracking system.

In an aspect of the invention, the Subject tracking neural network is configured with Long Short-Term Memory (LSTM) or is configured as a recurrent convolutional neural network (RCNN).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

Using various machine learning techniques and frameworks, it is possible to analyze data sets to extract patterns and correlations that may otherwise have never been noticed when subject to human analysis alone. Using carefully tailored training data inputs, a machine learning system can be manipulated to learn a desired operation, function, or pattern. The performance of a machine learning system largely depends on both the quality and the quantity of these carefully tailored data inputs, also known as training data. Machine learning is capable of analyzing tremendously large data sets at a scale that continues to increase; however, the ability to build and otherwise curate appropriately large training data sets has lagged and continues to be a major bottleneck in implementing flexible or real-time machine learning systems.

This problem of generating appropriate training data is particularly apparent when performing deep learning or otherwise seeking to train machine learning systems to track one or more specific individuals. Tracking a specific individual (also referred to herein as a "Subject") requires conventional machine learning systems to both detect objects and then classify detected objects before performing tracking of the Subject, and each function may often require a separate training data set, i.e. a first training data set for object detection and a second training data set for object classification. Because of these extensive training data requirements, the problems facing conventional machine learning-based tracking systems are two-fold. First, the training process is cumbersome and must be performed in advance, which consequently results in machine learning-based tracking systems being deployed in a static configuration that is unable to be updated or modified. Secondly, object classification categories are often coarse and generalized, valuing breadth of classification over depth of classification. These problems become apparent in conventional machine learning-based tracking systems when such systems must perform target reacquisition, e.g., when the Subject being tracked is temporarily 'lost' and the system must re-detect the Subject. Consider a Subject that is being tracked by a conventional machine learning-based tracking system—the tracking system receives an initial identification or selection of the Subject that is to be tracked (e.g. selection within a video frame), and then uses this initial selection to continuously update the location of the selected Subject in subsequent video frames. If the Subject moves outside of the video frame and then re-enters at some later point in time, the tracking system will detect and classify a human in general but will not recognize that this is the selected Subject for tracking because the chain or temporal linkage between the initially selected Subject and the presently detected human has been broken. Accordingly, it is a goal of the present disclosure to provide a machine learning-based tracking system that can be trained (and/or re-trained) in substantially real-time, i.e. after being deployed, such that the system can be dynamically reconfigured after deployment, and moreover, can provide much greater depth of classification by training the machine learning-based tracking system to recognize, track, and subsequently reacquire a Subject or specific individual.

Disclosed herein are systems and methods for the substantially real-time adjustment of one or more neural networks (NNs) for the autonomous tracking and localization of a moving Subject. The one or more neural networks disclosed herein can be provided as recurrent networks, non-recurrent networks, or some combination of the two, as will be described in greater depth below. For example, recurrent models can include, but are not limited to, recurrent neural networks (RNNs), gated recurrent units (GRUs), and long short-term memory (LSTMs). Additionally, the one or more neural networks disclosed herein can be configured as fully-connected network networks, convolutional neural networks (CNNs), or some combination of the two.

Figure 1:
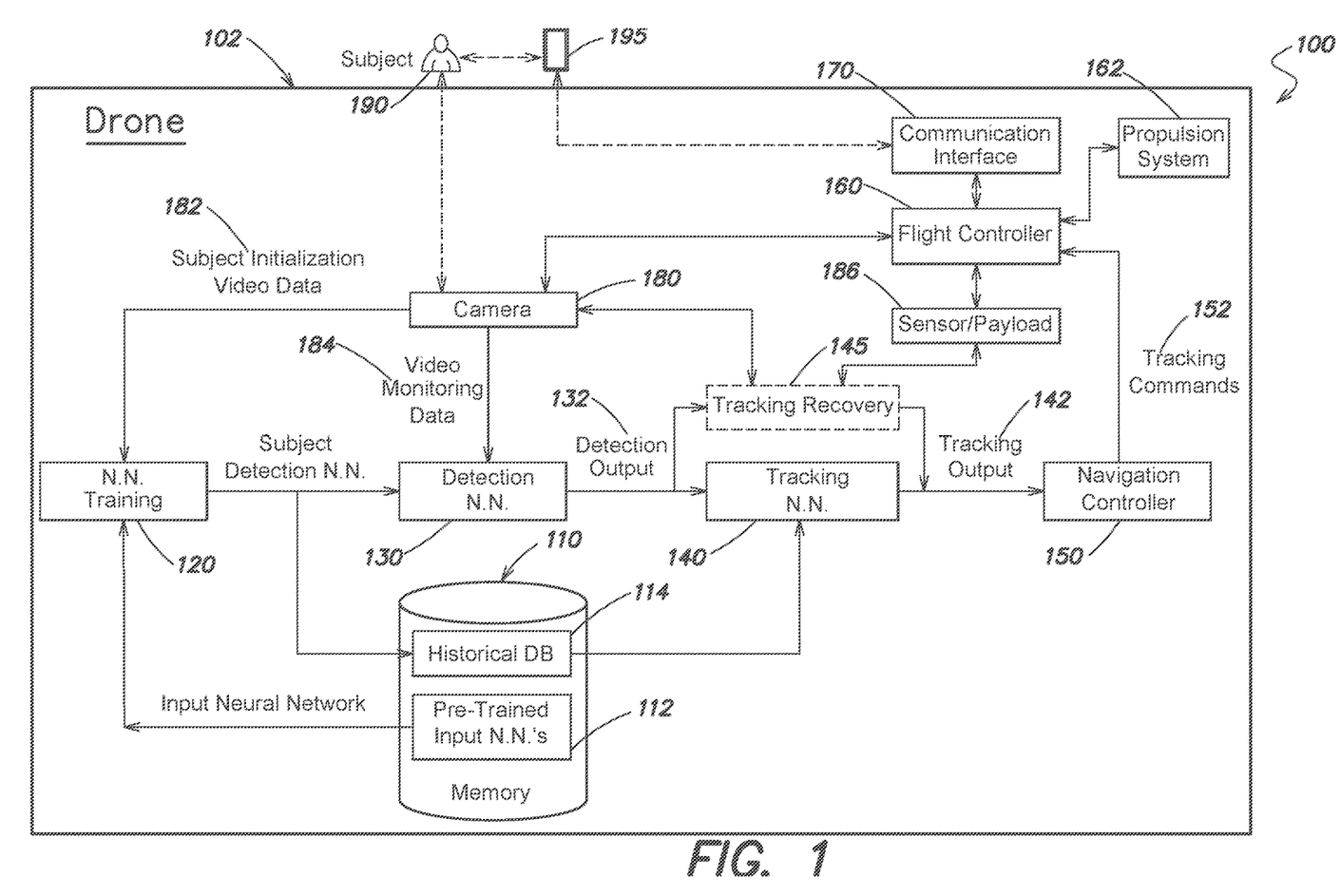
FIG. 1 depicts an example architecture for real-time neural network adjustment for target detection and tracking neural networks onboard a drone, according to one or more aspects of the present disclosure.

Turning first to FIG. 1, depicted is an illustrative architecture 100 of a drone 102 that implements real-time adjustment of one or more neural networks for the autonomous tracking and localization of a moving Subject (hereinafter referred to as "the Subject" or "Subjects"). Here, a human user 190 is the Subject with respect to which drone 102 will perform for autonomous tracking and localization, although it is appreciated that various other mobile objects and targets, both human and non-human, can be tracked and localized as the Subject without departing from the scope of the present disclosure.

As illustrated, drone 102 includes a memory 110, a neural network training system 120, a Subject detection neural network 130, a Subject tracking neural network 140, a tracking recovery system 145, a navigation controller 150, a flight controller 160, a communication interface 170, a camera 180, sensors and payload components 184, and a propulsion system 162. Although not specifically illustrated, it is appreciated that one or more of the Subject detection neural network 130 and the Subject tracking neural network 140 can include, but are not limited to, various ones of the specific neural network types discussed above, without departing from the scope of the present disclosure.

In order to perform the real-time, onboard neural network adjustment of the present disclosure, neural network training system 120 must first receive an input neural network. As illustrated in FIG. 1, onboard memory 110 contains one or more pre-trained input neural networks 112. As suggested by their name, the pre-trained input neural networks 112 are trained in advance, before being loaded into the onboard memory 110 of drone 102. In this manner, the pre-trained input neural networks 112 do not depend directly on the hardware of drone 102 and are not subject to the same limitations of available time and available processing power that would be present for onboard processing performed by drone 102.

Pre-Trained Input Neural Networks (112)—Pre-Training Datasets

The pre-trained input neural networks 112 can be trained on one or more general purpose training data sets that are designed for conventional object detection and/or tracking purposes. In some embodiments, the pre-trained input neural networks 112 can include one or more pre-trained neural networks based on the YOLO Detection System (see "*You Only Look Once: Unified, Real-Time Object Detection*", Joseph Redmon et al., University of Washington; "*YOLOv3: An Incremental Improvement*", Joseph Redmon et al., University of Washington). To perform pre-training, the YOLO neural networks can be trained on one or more general purpose training data sets that cover a wide range of different object classes and classifications.

In some embodiments, the YOLO neural network (or other ones of the pre-trained input neural networks 112) can be trained on supplemental training data that is specific to the use case of tracking a human Subject with drone 102. This supplemental training data can include video frames or other image data that is particular to humans (as opposed to general purpose data that includes image data of many other object types besides humans), such that the use of the supplemental training data improves the ability of the pre-trained input neural network 112 to detect human Subjects. The ability to detect human Subjects can be quantified by factors including a detection rate, a detection time, a detection confidence, etc. Note that the supplemental training data pertains to humans in general and is not specific to just Subject 190 of the specific example of FIG. 1.

The supplemental training data can additionally or alternatively be derived from video or other image data of humans in low-light conditions, partially obstructed conditions, and various other adverse conditions that drone 102 might experience when performing real-world tracking of a Subject. This low-light training data can be obtained from existing image sources (e.g. security cameras) or can be specifically captured for purposes of constructing the low-light training data set. For example, one or more drones similar to drone 102 can be used to collect and generate the supplemental low-light training data over the course of their normal operation, e.g. drone 102 might be deployed to monitor a Subject while he walks from his office to his home at night and the video captured by drone 102 can then be utilized to build the supplemental low-light training data set. In some embodiments, video and image data captured by drone 102 (or other drones) might not be utilized to build the supplemental low-light training data set directly, perhaps due to privacy concerns. However, video and image data captured by drone 102 can be anonymized and used to guide a decision of the particular scenarios or lighting conditions to target for inclusion in future supplemental low-light training data sets. For example, the anonymized data might indicate that drone 102 struggles to perform tracking in instances of foggy weather during sunset—this information could be used to guide a decision to capture video data in foggy sunset conditions and include the data in a supplemental training data set for future pre-trained input neural networks 112.

In this manner, the supplemental training data allows the pre-trained input neural networks 112 to become more specifically attuned to detecting human Subjects during the anticipated conditions (i.e. often dark or night-time lighting) in which drone 102 will be operated. Because it is anticipated that drone 102 will be utilized to track humans such as Subject 190, the pre-trained input neural networks 112 can be modified to remove all object classifiers that do not apply to human Subjects. For example, the pre-trained neural networks 112 can be modified to remove any training and/or classifiers for objects such as airplanes, trees, birds, etc. because there is not an anticipated need for drone 102 to detect, classify, and track such objects. By foregoing training on these extraneous objects, the amount of time and computational resources required to generate the pre-trained neural networks 112 can be substantially reduced.

In this sense, while conventional image detection and classification training data sets can be used as a starting point in generating pre-trained neural networks 112, these training sets can be modified to 1) limit detection breadth by removing extraneous object classifiers, and 2) increase detection depth by using supplemental training data corresponding to the anticipated detection target (humans) and in the anticipated detection conditions.

The pre-trained neural networks 112 can be loaded into onboard memory 110 during the manufacture of drone 102, during the initial setup and configuration of drone 102 (e.g. by Subject 190), or subsequent to the initial setup of drone 102 (e.g. transmitted to the drone over communication interface 170). In some embodiments, updates to the pre-trained input neural networks 112 can be transmitted to drone 102 as the updates become available, e.g. on the basis of an improved training procedure and/or the availability of new supplemental training data.

The description above makes reference to scenarios in which the pre-trained input neural networks 112 are trained on training data that is not specific to Subject 190 but is instead generalized to humans as an object classification as a whole. However, it is also possible that the pre-trained neural networks 112 can be trained on training data that is specific to Subject 190. For example, Subject-specific pre-training of the input neural networks 112 can be used to establish an initial link between drone 102 and Subject 190 such that the Subject 190 is in effect 'registered' into one or more of the pre-trained input neural networks 112. In some embodiments, this one-time Subject registration process could take place when Subject 190 first purchases, registers, or activates drone 102. In one example, Subject 190 might be guided through an initial registration process with drone 102 that causes onboard camera 180 to capture video and/or image data of Subject 190 from various different angles, in various different lighting conditions, etc. In some embodiments, Subject 190 might be guided through various poses and lighting conditions for camera 180 to capture various image or video data for purposes of pre-training a Subject-specific input neural network 112.

Neural Network Training System (120)—Real-Time Training

The disclosure turns now to neural network training system 120, which takes as input a pre-trained neural network 112 and performs additional real-time training that is unique to a current tracking session and/or the currently tracked Subject 190. In particular, neural network training system 120 receives initialization video data 182 from camera 180 and uses the initialization video data 182 to perform real-time training of the input neural network 112. By controlling drone 102 through certain flight patterns, camera 180 captures initialization video data 182 to include imagery of Subject 190 from multiple different angles and/or lighting conditions. The initialization video data 182 therefore uniquely corresponds to Subject 190, as does the real-time training of the input neural network 112 that is based on the initialization video data 182.

For example, the unique initialization video data 182 can be obtained by controlling drone 102 to fly a fixed pattern around Subject 190 as soon as drone 102 is deployed or turned on. Methods by which drone 102 can be deployed include, but are not limited to: manual actuation of a button on the chassis of drone 102; selection of a virtual button or user interface element on a mobile application 195 that provides a link between Subject 190 and communication interface 170 of drone 102; remote activation of drone 102 via communication interface 170; and autonomous activation of drone 102 based on a sensed or detected condition.

The fixed flight pattern which drone 102 flies around Subject 190 in order for camera 180 to capture suitable initialization video data 182 can include, but is not limited to, a 200-degree arc, a 360-degree circle, or various other flight patterns designed to capture video frame data of Subject 190 from multiple different angles and/or lighting conditions. In some embodiments, the payload components 184 of drone 102 can include a spotlight or other lighting apparatus, such that the lighting apparatus can be modulated (e.g. on/off, brighter/dimmer, etc.) to create varying lighting conditions for camera 180 to capture while drone 102 flies its fixed flight pattern.

In general, it is contemplated that the amount of session initialization video data 182 captured by camera 180 is much smaller in comparison to an amount of real-time video monitoring data 184 (described below) that will later be captured for purposes of actually tracking Subject 190. For purposes of the present discussion, it is noted that the number of frames and/or amount of time over which the unique session initialization video data 182 of Subject 190 is captured can vary, but in some embodiments might be on the order of 10-100 frames or 5-10 seconds. However, it is appreciated that various other numbers of frames and video capture durations can be employed without departing from the scope of the present disclosure. In some embodiments, one or more frames of session initialization video data 182 can be down-scaled, compressed, or otherwise reduced in resolution or color-space data. In some instances, the session initialization video data 182 can be down-sampled, e.g. take every fifth frame of video captured at 30 fps, because there is insufficient change between consecutive frames of video captured at the natural or selected frame rate of camera 180. By selecting only certain frames of the session initialization video data 182, the processing burden incurred to perform substantially real-time neural network training based on this initialization video data 182 can be significantly reduced. In some embodiments, the number of frames of video data that are utilized or discarded can be adjusted based on the performance of the real-time training being performed by neural network training system 120, such that substantially real-time training performance is always maintained.

Regardless of any pre-processing applied to the raw initialization video data 182 (e.g. down-sampling, down-scaling, compression, etc.), the initialization video data 182 is captured and immediately transmitted to neural network training system 120 for use in real-time training of pre-trained input neural network 112. One or more onboard Graphical Processing Units (GPUs) (not shown) of drone 102 can be utilized to perform the underlying calculations and computations for this real-time training at neural network training system 120. In some embodiments, an onboard GPU can be provided as an NVIDIA Jetson TX2, although other GPUs can be utilized without departing from the scope of the present disclosure.

The above description assumes that drone 102 is able to capture the requisite session initialization video data 182 of Subject 190, but this is not always the case. In other words, in some instances the real-time training process might fail at neural network training system 120, e.g. because no initialization video data 182 was received, insufficient video data 182 was received, low-quality video data 182 was received, etc. For example, drone 102 might be deployed in too tight of a space to properly execute its fixed flight pattern around Subject 190, which would result in low-quality initialization video data 182 being captured. Alternatively, Subject 190 might be moving too rapidly away from camera 180 and drone 102, etc. In such circumstances, neural network training system 120 can perform a fallback process—relying on historical data 114 stored within onboard memory 110. The fallback process can be used to supplement whatever amount or quality of initialization video data 182 was captured, or the fallback process can be used to replace whatever initialization video data 182 was captured. In some embodiments, the fallback process might forego initialization video data 182 altogether and instead cause neural network training system 120 to output a Subject detection neural network 130 that was generated at some previous time, corresponding to a previous tracking session with the Subject 190. Historical datastore 114 can include a repository of initialization video data 182 and target detection neural networks 130 as captured or generated, respectively, in previous tracking sessions with Subject 190. In some embodiments, the historical datastore 114 can be used to perform a cumulative training process—rather than neural network training system 120 receiving as input a pre-trained input neural network 112, the cumulative training process causes neural network training system 120 to utilize the target detection neural network 130 that was generated in the immediately preceding tracking session with Subject 190. In other words, the Subject tracking session n takes as input the Subject-specific detection neural network 130 that was generated during Subject tracking session n−1.

Subject Detection Neural Network (130)

In operation, neural network training system 120 takes its two inputs (i.e., pre-trained input neural network 112 and initialization video data 182), performs real-time training, and generates as output a Subject detection neural network 130, i.e. which is trained to be Subject-specific or specific to Subject 190. Unlike the pre-training process described with respect to the pre-trained input neural networks 112, which is performed only once, this Subject-specific training process is performed in real-time whenever drone 102 is deployed or a new tracking session is otherwise triggered. As an additional distinguishing factor, while pre-trained input neural networks 112 are trained to detect and track objects (or humans) in general, the Subject-specific target detection neural network 130 is trained (in real-time) to detect and track only the specific Subject 190 associated with the tracking session.

In some embodiments, neural network training system 120 uses initialization video data 182 to train the input neural network 112 based on a discriminative training theory, such that the resulting neural network (i.e., Subject detection neural network 130) has increased discrimination between Subject 190 and other humans. For example, different classification structures and/or ranking scores within the general classification of 'human' can be employed to achieved increased discrimination between Subject 190 and other humans. Under the discriminative training theory, Subject detection neural network 130 is trained such that it is able to analyze real-time video monitoring data 184 and detect Subject 190 within a given video frame of the monitoring data 184 based on, e.g., the largest ranking or weighting score/factor assigned within the given video frame.

In some embodiments, neural network training system 120 uses initialization video data 182 to train the input neural network 112 based on an exclusionary training theory, such that the resulting neural network (i.e., Subject detection neural network 130) only recognizes Subject 190 and ignores or fails to classify other Subjects. For example, the general classification of 'Subject' can be manipulated such that only Subject 190, as learned from the initialization video data 182, is classified as 'Subject'. Under such training, all other Subjects will be classified as unknown or irrelevant objects, and Subject 190 will be thus be the only Subject possibly detected within a given frame of the real-time video monitoring data 184 that is captured by drone 102.

In operation, Subject detection neural network 130 receives real-time video monitoring data 184 captured by camera 180. This monitoring data 184 is captured as Subject 190 moves through the surrounding environment and in each video monitoring frame, Subject detection neural network 130 performs a detection process in which the neural network attempts to generate bounding box coordinates that correspond to the location of Subject 190 within a given video monitoring frame of real-time video monitoring data 184.

The bounding box coordinates themselves are generated by the detection functionality of Subject detection neural network 130—this is a functionality largely deriving from the pre-trained input neural network 112 on which the Subject detection neural network 130 is based. However, the actual classification of a given bounding box is generated by the classification functionality of the Subject detection neural network 130—this is a functionality largely deriving from the real-time training that was performed onboard drone 102 by neural network training system 120, using the unique session initialization video data 182 captured in the first 5-6 seconds of drone 102 being deployed.

For each frame of real-time monitoring data that is analyzed by Subject detection neural network 130, neural network 130 generates a corresponding detection output 132. In many cases, detection output 132 consists of the bounding box coordinates of Subject 190 as detected in the given frame of video monitoring data 184.

Subject Tracking Neural Network (140)

In some embodiments, and as illustrated in FIG. 1, Subject detection neural network 130 transmits detection output 132 to a Subject tracking neural network 140, which then uses detection output 132 to generate a predictive tracking output 142. Predictive tracking output 142 can consist of predicted bounding box coordinates corresponding to a predicted position of Subject 190 in the current given frame of video monitoring data 184 or a predicted position of Subject 190 as extrapolated from the previous frame(s) of video monitoring data 184. In some embodiments, Subject tracking neural network 140 utilizes historical data from datastore 114 of onboard memory to supplement the generation of predictive tracking output 142.

Subject tracking neural network 140 analyzes historical monitoring and tracking data from earlier in the session (and/or from previous sessions with the Subject 190), as well as the current frame(s) of real-time video monitoring data 184, in order to thereby generate a predictive bounding box (tracking output 142) representing a future predicted location of Subject 190. More particularly, Subject tracking neural network 140 can perform temporal regressions over location history data of Subject 190, wherein the location history data of Subject 190 comprises the bounding box detection outputs 132 generated by Subject detection neural network 130 in previous time steps, i.e. for previous video frames of the monitoring data 184. In this manner, the predictive bounding box tracking output 142 is robust against, and generally resistant to, tracking loss and detection failure and moreover, can assist drone 102 in tracking reacquisition operations and other recovery processes. Subject tracking neural network 140 thus extends the functionality of Subject detection neural network 130.

As discussed above, Subject detection neural network 130 generates a bounding box coordinate 132 corresponding to the location of Subject 190 within a given frame of video monitoring data 184. This bounding box coordinate 132 can be thought of as a spatial constraint, i.e. reducing the set of possible Subject locations within the x-y coordinates of the video frame, such that the bounding box coordinate converges upon detection of the Subject 190 within the frame of video monitoring data 184.

In contrast, Subject tracking neural network 140 generates and applies a temporal constraint on top of the already spatially constrained output 132 of Subject detection neural network 130, i.e. reducing the set of possible Subject locations over the time dimension of the sequence of video frame data 184, such that Subject tracking neural network 140 generates a predictive tracking bounding box coordinate 142 corresponding to a predicted location of Subject 190 in a subsequent frame(s) of video monitoring data 184.

In some embodiments, Subject tracking neural network 140 can be configured as a Long Short-Term Memory (LSTM), such that the addition of the LSTM to allows the resultant neural network to model self-learned contextual information of the location of Subject 190. (See, for example, "*Spatially Supervised Recurrent Convolutional Neural Networks for Visual Object Tracking*", Guanghan Ning et al., University of Missouri). In general, LSTM 140 can be employed as a tracking module with memory cells to store and output detection information of the Subject being tracked. Based on these memory cells, LSTM 140 is able to discover long-range temporal relations for a given tracked target, such as Subject 190. Using these discovered temporal relations, LSTM 140 imposes the aforementioned temporal constraint on top of the detection output 132 of target detection neural network 130 and generates the predictive tracking bounding box coordinate tracking output 142 for the predicted location(s) of target user 190.

In some embodiments, as an alternative to or in addition to employing an LSTM as described above, Subject tracking neural network 140 can include a neural network framework configured to perform Subject re-identification based on disjoint, non-overlapping camera view angles to characterize and track targets (e.g. user 190) using view-specific knowledge. (See, for example, "*Learning View-Specific Deep Networks for Person Re-Identification*", Zhanxiang Feng et al., IEEE Transactions on Image Processing; and "*Person Re-Identification in the Wild*", Liang Zheng et al., University of Technology Sydney). In such an embodiment requiring non-overlapping camera view angles, camera 180 mounted on drone 102 can be configured to include multiple cameras having the requisite non-overlapping view angles, camera 180 can be configured as a plurality of individual cameras mounted at discrete locations on drone 102, or both. In some embodiments, the non-overlapping view angles can be captured from additional drones that are separate from but operate in conjunction with drone 102.

Tracking Recovery (145)

In some scenarios, Subject detection neural network 130 might fail to detect Subject 190 and generate a bounding box detection output 132 for one or more given frames of real-time monitoring data 184. Additionally, Subject tracking neural network 140 might fail to generate a predictive bounding box tracking output 142 for the same one or more given frames of real-time monitoring data 184. This is scenario of total tracking loss, which necessitates a tracking recovery procedure, as provided herein by tracking recovery system 145.

When neither a current location (bounding box 132) nor a predicted location (predictive bounding box 142) can be generated for one or more consecutive frames of monitoring video data 184, tracking recovery system 145 is triggered. In a first example, tracking recovery system 145 performs tracking reacquisition by requiring Subject 190 to perform an agreed upon action (e.g. make a specific gesture, make a certain sound) and then collecting additional video/sensor data and looking for that agreed upon action. If the agreed upon action is detected, then tracking recovery system 145 has reacquired Subject 190.

The agreed upon action can be pre-determined, e.g. Subject 190 knows to perform a pre-determined action when the Subject is unable to see drone 102, believes drone 102 has lost tracking, etc. The agreed upon action can also be transmitted to Subject 190, e.g. to mobile application 195 running on a mobile computing device associated with Subject 190. Mobile application 195 can receive a notification or other message indicating that tracking has been lost and immediate Subject action is required, where the notification/message includes the action that Subject 190 must perform in order for tracking recovery system 145 to perform tracking recovery. This notification or message can be transmitted to the Subject's mobile application 195 by drone 102, e.g. using communication interface 170, or can be transmitted to the Subject's remote application 195 from a remote source Tracking recovery system 145 can leverage existing components already onboard drone 102 (e.g. camera 180, sensors/payload 184, etc.), but may be hampered by the issue of Subject compliance—it is often the case that tracking is lost when the Subject being tracked (e.g. Subject 190) is located in a high-stress and/or crowded environment, making it difficult to communicate a request for Subject 190 to perform the agreed upon recovery action (make a specific gesture, make a certain sound, etc.). In other words, the very conditions that cause drone 102 to lose tracking of Subject 190 also make Subject 190 much less likely to notice and respond to a notification (e.g. transmitted to his mobile phone) that tracking has been lost and he must perform a reacquisition action. The more time that elapses from the moment of tracking failure, the less likely it is that tracking recovery system 145 will be able to successfully reacquire the lost Subject 190 (e.g. based on the assumption that Subject 190 keeps moving and, therefore, the probability of remaining within detection range of drone 102 decreases with time).

Navigation Controller (150)

In some embodiments, detection output 132 (consisting of a bounding box coordinate generated by Subject detection neural network 130), might be transmitted directly to navigation controller 150. As discussed above, navigation controller 150 can also receive tracking output 142 (consisting of a predictive bounding box coordinate generated by Subject tracking neural network 140). Additionally, navigation controller 150 can receive a tracking recovery output, consisting of a bounding box coordinate generated by tracking recovery system 145 to correspond to the location where the agreed upon Subject recovery action was detected.

Although generated in a different manner, these inputs may all be in the form of a bounding box coordinate, which represents a location of Subject 190 (actual or predicted) relative to a corresponding frame of video monitoring data 184. Accordingly, navigation controller 150 is operative to analyze received bounding box coordinates—regardless of whether the bounding box coordinate is received from Subject detection neural network 130, Subject tracking neural network 140, or tracking recovery system 145—and to subsequently generate tracking commands 152 that will reposition drone 102 and/or camera 180 relative to Subject 190 such that Subject 190 is centered (or re-centered) within the frame of video monitoring data 184. For example, navigation controller 150 might generate tracking commands that cause drone 102 to translate left/right to reposition Subject 190 in the center of the video frame or might generate tracking commands that cause camera 180 to pan left/right to reposition Subject 190 in the center of the video frame, or both. If Subject 190 is not currently centered in the video monitoring frame captured by camera 180, then navigation controller 150 knows that the tracking commands it generated in the previous time step(s) were incorrect. In some embodiments, navigation controller 150 can be provided as a PID (proportional-integral-derivative) controller that operates based on the detected error between the center of the bounding box coordinate output by the Subject detection neural network 130 and the actual, fixed center-point of the video monitoring frame 184 captured by camera 180.

After navigation controller 150 generates tracking commands 152 suitable to re-center Subject 190 within the video monitoring frame 184, navigation controller 150 transmits tracking commands 152 to a flight controller 160, which then translates tracking commands 152 into component-level control signals and transmits them directly to the drone propulsion system 162. In this manner, navigation controller 150 uses received bounding box coordinates to continuously generate tracking commands 152 that cause drone 102 to track Subject 190 by keeping Subject 190 centered in each of the video frames 184 captured by camera 180.

Figure 2A:
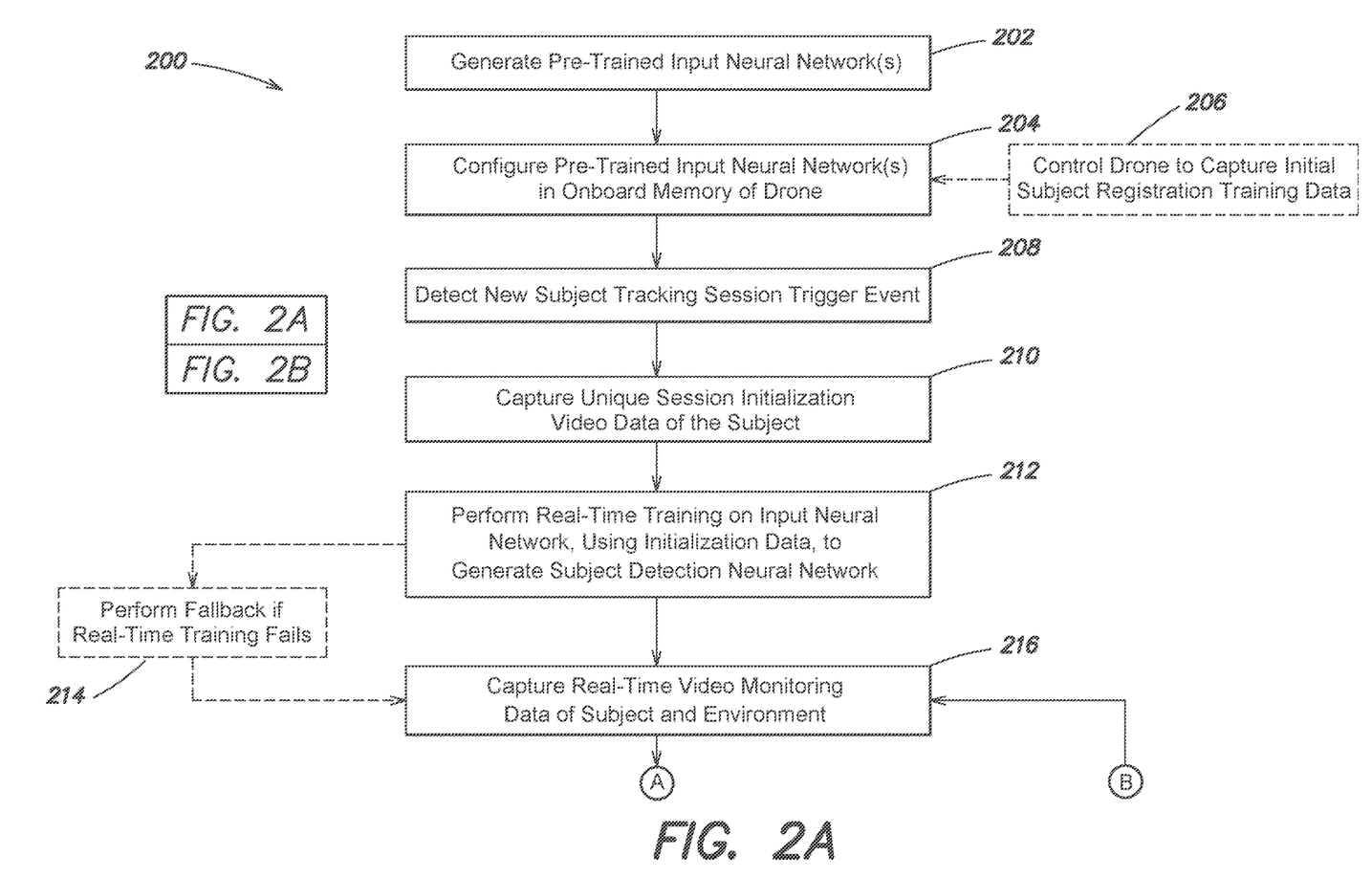
FIGS. 2A-B depict an example method according to one or more aspects of the present disclosure.
Figure 2B:
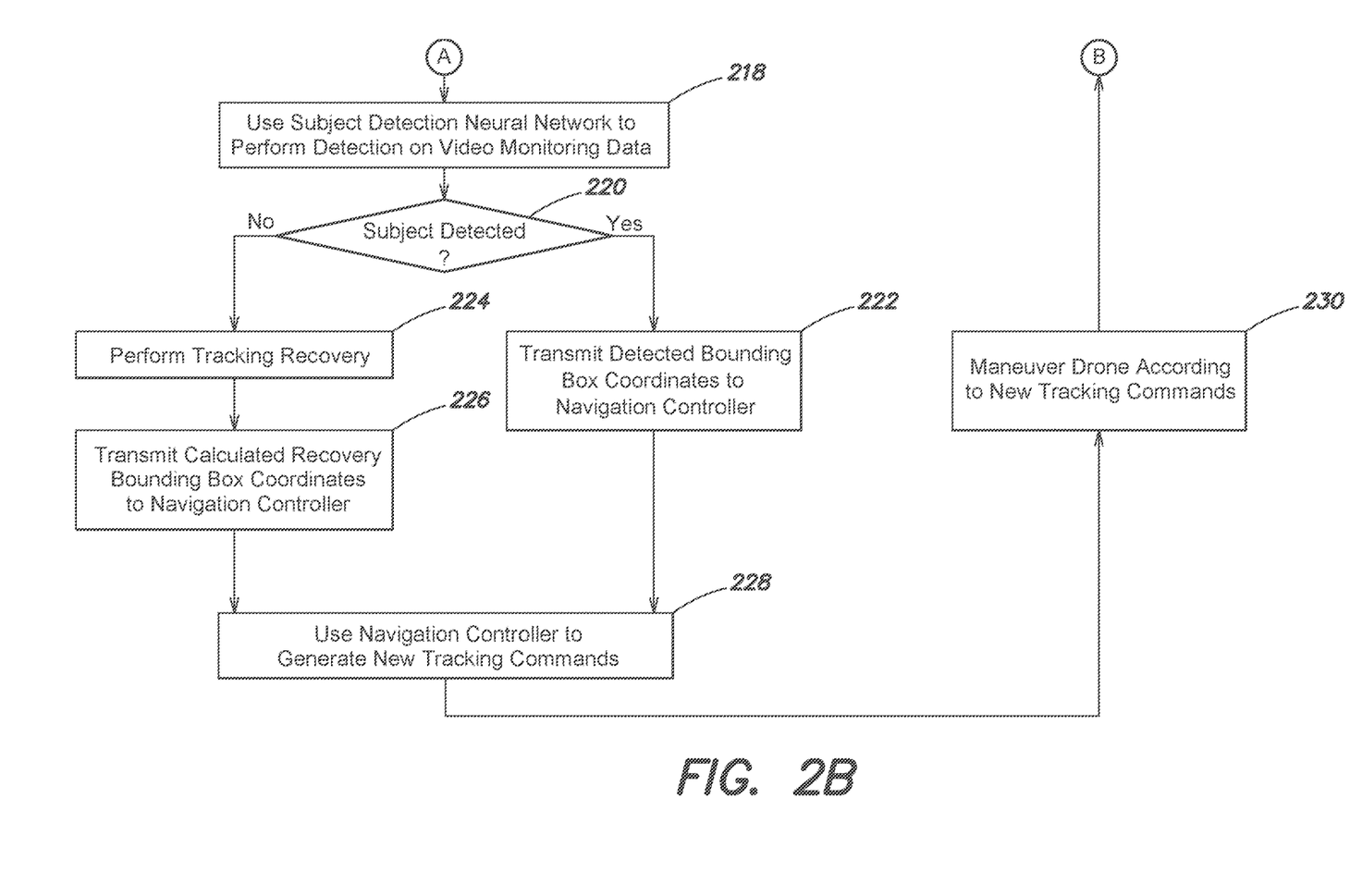

FIGS. 2A-B depict an example method 200 according to aspects of the present disclosure. As illustrated, the method begins with a step 202, in which a pre-trained input neural network is generated. This pre-trained input neural network can be trained on publicly available training data sets, object detection training data sets, object classification training data sets, or any combination of the three. Supplemental training data corresponding to humans (or some other intended Subject type) can be used to reinforce and extend the neural network's training with respect to detecting and classifying the intended Subject type. In the example where the intended Subject type is humans, the supplemental training data can comprise labeled data of various different humans, e.g., shot from different angles and/or different lighting conditions.

In a step 204, the pre-trained input neural networks are configured in onboard memory of a drone, such as the drone 102 described with respect to FIG. 1. The pre-trained input neural networks can be loaded into memory of the drone during its manufacture; can be loaded into memory of the drone during setup, configuration, or initialization by an end user (e.g. such as Subject 190 of FIG. 1) associated with the drone; can be wirelessly transmitted to a communication interface of the drone, etc. Updated pre-trained input neural networks can also be transmitted to the drone or otherwise loaded into its onboard memory as the updates become available.

In an optional step 206, the drone can be controlled to capture initial Subject registration training data, which can be a one-time extended training data set captured in order to create an initial binding between the user of the drone (i.e. the Subject) and the Subject detection and/or tracking neural networks that are provided on the drone. The initial Subject registration data can be collected from a variety of angles and in various different lighting conditions. In some embodiments, the Subject can be guided through the data capture process by a mobile application communicatively coupled to the drone, or by a setup wizard provided on the Subject's mobile device or computer. In some embodiments, the Subject can upload previously captured video data of himself/herself to the onboard memory of the drone, such that the Subject's uploaded video functions as initial Subject registration training data for the neural networks provided onboard the drone.

In a step 208, a new Subject tracking session trigger is detected. This trigger indicates a request for the drone to begin performing autonomous tracking of the Subject. The trigger can be received based off of the manual actuation of a button, e.g. on the chassis of the drone; the drone being deployed or powered on; the selection of a virtual button on a touchscreen device; a verbal command; a gesture-based command; a remotely transmitted command; an environmental condition autonomously detected by the drone, etc.

In a step 210, immediately or shortly after being deployed and taking flight, the drone is controlled through a stored flight path to capture unique session initialization video data of the Subject. For example, the drone might be controlled to fly a 200-degree arc or 360-degree circle around the Subject, although it is appreciated that various other flights paths are possible without departing from the scope of the present disclosure. In the course of traveling through this flight path, one or more cameras configured onboard the drone capture the unique session initialization video data of the Subject. Because the drone flies a path around the Subject, the session initialization video data includes images of the Subject that are captured from a variety of different angles and/or under various different lighting conditions. In some embodiments, the drone may modulate a lighting device in order to create various different lighting conditions as it captures the session initialization video data of the Subject.

In a step 212, the drone performs onboard real-time training of a pre-trained input neural network (see step 202 re: pre-trained input neural network(s)). Using the unique session initialization video of the Subject that was captured in step 210, real-time training is applied to extend the capabilities of the input neural network to uniquely detect and classify the Subject. The output of this real-time training process is a Subject-specific detection neural network.

In a step 214, a fallback process is performed in instances where the real-time neural network training of step 212 fails or is otherwise incomplete and/or of an undesirable quality. In the fallback process, previously captured (e.g. from a different tracking session with the same Subject) initialization video data is used to perform real-time neural network training as in step 212. In some embodiments, the fallback process utilizes or substitutes a Subject detection neural network that previously underwent onboard real-time training during an earlier tracking session between the drone and the Subject.

In a step 216, the real-time tracking and monitoring session of the Subject begins and the drone uses its onboard camera(s) to capture real-time video monitoring data of the Subject and his/her surrounding environment. While capturing this video monitoring data, the drone may attempt to maintain a fixed distance and/or angular displacement with respect to the Subject.

In a step 218, the Subject-specific neural network is used to perform Subject detection on one or more frames of the real-time video monitoring data of the Subject that was captured in step 216. The output of this Subject detection as performed by the Subject detection neural network are one or more bounding box coordinates indicative of the location of the Subject within a given frame of the video monitoring data being analyzed.

In a step 220, a determination is made as to whether or not the output of the Subject detection neural network (see step 218) successfully detected the Subject. If the detection was successful, the method proceeds to a step 222. If the detection was unsuccessful, the method proceeds to step 224.

In step 222, in response to a successful detection of the Subject within a given frame of video monitoring data, the bounding box coordinates generated by the Subject detection neural network in step 218 are transmitted to a navigation controller onboard the drone In step 224, in response to an unsuccessful detection of the Subject within a given frame of video monitoring data, tracking recovery is performed by the drone. Tracking recovery can include transmitting an agreed upon action (such as a gesture or verbal cue) to the Subject being tracked, e.g. by transmitting a message or notification from the drone to a mobile device or computer of the Subject. Upon receipt of the message or notification continuing the agreed upon action, the Subject performs the agreed upon action, which the drone monitors/searches for in incoming real-time video monitoring data. If the agreed upon action is detected, then the drone has reacquired tracking of the Subject. If the agreed upon action is not detected, then the Subject may repeat the agreed upon action until it is detected by the drone, and/or the drone may transmit additional messages to the Subject requesting a different agreed upon action be performed. This process can continue until the drone detects an agreed upon action and reacquires tracking of the Subject.

In a step 226, after detecting an agreed upon action, the drone generates a calculated recovery bounding box coordinate corresponding to the location in which the agreed upon action was detected in one or more frames of incoming video monitoring data collected in step 224 during the tracking recovery process. This calculated recovery bounding box coordinate is then transmitted to the navigation controller onboard the drone.

In a step 228, the navigation controller onboard the drone receives a bounding box coordinate, e.g. either transmitted from the Subject detection neural network in step 222 or transmitted from the tracking recovery system in step 226. Upon receiving the bounding box coordinate, the navigation controller generates commands to maneuver one or more of the drone and its onboard camera(s) into a position such that the Subject will be centered in the frame of video monitoring data captured by the drone. In some embodiments, the navigation controller can be provided as a PID controller.

In a step 230, the navigation controller's commands are transmitted to one or more propulsion and/or control systems of the drone and are executed to thereby maneuver the drone according to the tracking commands generated by the navigation controller. At this newly maneuvered to position, the drone captures additional real-time video monitoring data of the Subject and the method returns to step 216, where the cycle can repeat until the tracking session between the drone and the Subject is terminated.

What is claimed is:

1. An autonomous tracking method, the method comprising:
    obtaining a pre-trained input neural network, wherein the pre-trained input neural network is pre-trained on one or more object classification training data sets, each object classification training data set including a human object classification;
    obtaining a low-light supplemental training data set, wherein the low-light supplemental training data set is different from the one or more object classification training data sets and comprises a plurality of labeled images of humans in low-light conditions;
    performing a first training process to generate a human-attuned neural network, wherein the human-attuned neural network is generated by using the low-light supplemental training data set to refine the human object classification of the pre-trained input neural network;
    obtaining Subject initialization video data, the Subject initialization video data comprising a plurality of video frames of a desired Subject for tracking;
    based on the Subject initialization video data, performing a real-time second training process to generate a Subject detection neural network from the human-attuned neural network, wherein the Subject detection neural network is generated by using the Subject initialization video data to update the human object classification of the human-attuned neural network to include a unique classification specific to the desired Subject;
    capturing, using a camera, real-time video monitoring data comprising a plurality of video frames of the desired Subject and a surrounding environment of the Subject;
    using the Subject detection neural network, performing Subject detection on the real-time video monitoring data to generate a detection output corresponding to a location of the desired Subject within a given frame of the real-time video monitoring data; and
    generating, based on the detection output, one or more first tracking commands maneuvering the camera such that the camera is centered on the location of the desired Subject.

2. The method of claim 1, further comprising:
    using a Subject tracking neural network, performing Subject tracking based on at least the detection output of the Subject detection neural network; and
    generating, using the Subject tracking neural network, a tracking output corresponding to a predicted location of the desired Subject within the given frame of the real-time video monitoring data.

3. The method of claim 2, further comprising generating, based on the tracking output, one or more second tracking commands maneuvering the camera such that the camera is centered on the predicted location of the desired Subject.

4. The method of claim 2, wherein Subject tracking is further performed based on one or more previously captured frames of the real-time video monitoring data.

5. The method of claim 1, wherein the detection output of the Subject detection neural network comprises bounding box coordinates corresponding to a pixel area of the given frame of real-time video monitoring data in which the desired Subject is located.

6. The method of claim 2, wherein the tracking output of the Subject tracking neural network comprises one or more predicted bounding box coordinates, wherein the predicted bounding box coordinates correspond to a predicted pixel area of the given frame of real-time video monitoring data that contains the Subject's predicted location.

7. The method of claim 1, wherein the Subject initialization video data is collected in response to a tracking session being triggered for the desired Subject.

8. The method of claim 1, wherein the Subject initialization video data consists of 5-10 seconds of video data.

9. The method of claim 1, wherein:
    the camera is coupled to a drone; and
    the one or more first tracking commands are generated to maneuver the drone to a spatial coordinate calculated to center the camera on the location of the desired Subject.

10. The method of claim 9, wherein real-time training of the input neural network is performed by a Graphics Processing Unit (GPU) onboard the drone.

11. The method of claim 9, wherein the one or more first tracking commands are generated by a PID (proportional-integral-derivative) controller.

12. The method of claim 1, wherein one or more of the input neural network and the Subject detection neural network comprise a deep learning-based tracking system.

13. The method of claim 2, wherein the Subject tracking neural network is configured with Long Short-Term Memory (LSTM) or is configured as a recurrent convolutional neural network (RCNN).

* * * * *